US008268952B2

(12) United States Patent
Van Gemert et al.

(10) Patent No.: US 8,268,952 B2
(45) Date of Patent: Sep. 18, 2012

(54) SUPRAMOLECULAR IONOMERS

(75) Inventors: Gaby Maria Leonarda Van Gemert, Landgraaf (NL); Ronny Mathieu Versteegen, Hegelsom (NL); Henricus Marie Janssen, Eindhoven (NL); Egbert Willem Meijer, Waalre (NL); Anton Willem Bosman, Eindhoven (NL)

(73) Assignee: Suprapolix B.V., Eindhoven (NL)

( * ) Notice: Subject to any disclaimer, the term of this patent is extended or adjusted under 35 U.S.C. 154(b) by 964 days.

(21) Appl. No.: 11/571,960

(22) PCT Filed: Jul. 11, 2005

(86) PCT No.: PCT/NL2005/000497
§ 371 (c)(1),
(2), (4) Date: Jan. 11, 2007

(87) PCT Pub. No.: WO2006/006855
PCT Pub. Date: Jan. 19, 2006

(65) Prior Publication Data
US 2009/0111930 A1    Apr. 30, 2009

Related U.S. Application Data

(60) Provisional application No. 60/586,873, filed on Jul. 12, 2004.

(30) Foreign Application Priority Data

Jul. 12, 2004  (EP) ..................................... 04077014

(51) Int. Cl.
*C08G 18/00* (2006.01)
*C08G 18/32* (2006.01)

(52) U.S. Cl. ................ 528/62; 528/44; 528/59; 528/60; 528/61; 528/64; 528/67; 528/68; 528/69; 528/73; 528/80; 528/84; 528/85

(58) Field of Classification Search .................... 528/44, 528/59–62, 64, 67–69, 73, 80, 84–85
See application file for complete search history.

(56) References Cited

U.S. PATENT DOCUMENTS

| | | | |
|---|---|---|---|
| 3,388,087 A | 6/1968 | Dieterich et al. | |
| 3,480,592 A | 11/1969 | Dieterich et al. | |
| 4,093,759 A | 6/1978 | Otsuki et al. | |
| 4,136,092 A | 1/1979 | Jackle et al. | |
| 4,140,759 A | 2/1979 | Mausner | |
| 4,216,318 A | 8/1980 | Brown et al. | |
| 4,322,327 A | 3/1982 | Yoshimura et al. | |
| 4,684,728 A * | 8/1987 | Mohring et al. | 544/182 |
| 4,942,035 A | 7/1990 | Churchill et al. | |
| 5,410,016 A | 4/1995 | Hubbell et al. | |
| 5,500,209 A | 3/1996 | Ross et al. | |
| 5,548,035 A | 8/1996 | Kim et al. | |
| 5,610,268 A | 3/1997 | Meijer et al. | |
| 5,631,337 A | 5/1997 | Sassi et al. | |
| 5,723,563 A | 3/1998 | Lawrey et al. | |
| 5,736,535 A | 4/1998 | Bernstein et al. | |
| 5,874,069 A | 2/1999 | Mendolia et al. | |
| 5,883,211 A | 3/1999 | Sassi et al. | |
| 5,919,441 A | 7/1999 | Mendolia et al. | |
| 6,320,018 B1 | 11/2001 | Sijbesma et al. | |
| 6,353,076 B1 | 3/2002 | Barr et al. | |
| 6,489,397 B2 * | 12/2002 | Kim et al. | 525/127 |
| 6,534,072 B2 | 3/2003 | Mondet et al. | |
| 6,683,151 B1 * | 1/2004 | Loontjens et al. | 528/44 |
| 6,716,370 B2 | 4/2004 | Kendig | |
| 6,743,767 B2 * | 6/2004 | Goldoni et al. | 510/475 |
| 6,803,447 B2 * | 10/2004 | Janssen et al. | 528/423 |
| 6,818,018 B1 | 11/2004 | Sawhney | |
| 6,899,992 B2 * | 5/2005 | Huang et al. | 430/270.1 |
| 6,972,304 B2 | 12/2005 | Smith et al. | |
| 7,196,073 B2 | 3/2007 | Marciani | |
| 7,622,131 B2 | 11/2009 | Bosman et al. | |
| 7,736,663 B2 | 6/2010 | Cooper et al. | |
| 2003/0013631 A1 | 1/2003 | Goldoni et al. | |
| 2003/0015185 A1 | 1/2003 | Dutart | |
| 2003/0019391 A1 | 1/2003 | Kendig | |
| 2003/0079644 A1 | 5/2003 | Smith et al. | |
| 2003/0092838 A1 | 5/2003 | Fomperie et al. | |
| 2003/0129506 A1 * | 7/2003 | Pappas et al. | 430/9 |
| 2003/0158403 A1 * | 8/2003 | Manoharan et al. | 536/25.3 |

(Continued)

FOREIGN PATENT DOCUMENTS

EP         0 259 92 B1      9/1983

(Continued)

OTHER PUBLICATIONS

Derwent Abstract for JP 52074692 A (Acc. No. 1977-55084Y).*
Hofmeier (New supramolecular polymers containing both terpyridine metal complexes and quadruple hydrogen bonding units. Chem. Commin., 2004, 318-319).*
Dieterich et al, "Polyurethane Ionomers, a New Class of Block Polymers," Angew. Chem. Int'l. Edit., vol. 9, No. 1, 1970, p. 40-50 (English version of German article in Angew. Chem., vol. 2, 1970, pp. 53-63).
Folmer et al., "Supramolecular Polymer Materials: Chain Extension of Telechelic Polymers Using a Reactive Hydrogen-Bonding Synthon," Adv. Mater., vol. 12, No. 12, 2000, pp. 874-878.

(Continued)

*Primary Examiner* — David Buttner
*Assistant Examiner* — Brieann R Fink
(74) *Attorney, Agent, or Firm* — Gilberto M. Villacorta; Sunit Talapatra; Foley & Lardner LLP

(57) ABSTRACT

The invention relates to supramolecular ionomers. i.e. polymers having quadruple hydrogen bonding units (4H-units) and ionic groups or ionogenic groups within their structure. The supramolecular ionomers can be dispersed or solubilized in water at high solids contents while maintaining low viscosities, facilitating easy use and processing of the resulting aqueous formulations. The aqueous supramolecular ionomer compositions have excellent film-forming properties. Moreover, the polymer materials have good mechanical properties after drying, as they are not tacky, show high elasticity and low or no creep.

27 Claims, No Drawings

U.S. PATENT DOCUMENTS

| | | | |
|---|---|---|---|
| 2003/0166822 A1* | 9/2003 | Benard et al. ............ | 528/44 |
| 2004/0023155 A1* | 2/2004 | Hayakawa et al. ........ | 430/271.1 |
| 2004/0034190 A1 | 2/2004 | Janssen et al. | |
| 2004/0087755 A1* | 5/2004 | Eling et al. ............ | 528/59 |
| 2004/0091812 A1* | 5/2004 | Huang et al. ............ | 430/270.1 |
| 2004/0161394 A1* | 8/2004 | Mougin et al. ............ | 424/70.11 |
| 2007/0093639 A1* | 4/2007 | Jassen et al. ............ | 528/327 |
| 2007/0149751 A1 | 6/2007 | Lindsay et al. | |
| 2007/0264208 A1* | 11/2007 | Mougin et al. ............ | 424/59 |
| 2010/0076147 A1 | 3/2010 | Hoorne-Van Gemert et al. | |
| 2011/0034641 A1 | 2/2011 | Janssen et al. | |

FOREIGN PATENT DOCUMENTS

| | | | |
|---|---|---|---|
| EP | 0 433 188 A1 | 6/1991 | |
| EP | 0 683 769 B | 11/1995 | |
| EP | 0 744 428 A2 | 11/1996 | |
| EP | 1 213 309 A1 | 6/2002 | |
| EP | 0 877 055 B1 | 9/2004 | |
| EP | 1 310 533 B2 | 1/2007 | |
| EP | 1 392 222 B1 | 9/2007 | |
| FR | 2657082 A1 | 7/1991 | |
| FR | 2825628 B1 | 12/2002 | |
| JP | 52074692 A | * | 6/1977 |
| JP | 2004-250623 A | 9/2004 | |
| WO | WO 98/14504 A | 4/1998 | |
| WO | WO-98/14505 A1 | 4/1998 | |
| WO | WO-99/07343 A1 | 2/1999 | |
| WO | WO-01/44307 A2 | 6/2001 | |
| WO | WO 02/46260 A | 6/2002 | |
| WO | WO-02/098377 A1 | 12/2002 | |
| WO | WO-03/032929 A2 | 4/2003 | |
| WO | WO-03/059964 A2 | 7/2003 | |
| WO | WO-03/099875 A2 | 12/2003 | |
| WO | WO-2004/016598 A1 | 2/2004 | |
| WO | WO-2004/052963 A1 | 6/2004 | |
| WO | WO-2005/042641 A1 | 5/2005 | |
| WO | WO-2006/118460 A1 | 11/2006 | |
| WO | WO-2006/118461 A2 | 11/2006 | |
| WO | WO 2007058539 A2 | * | 5/2007 |
| WO | WO-2007/072000 A1 | 6/2007 | |
| WO | WO-2008/063057 A3 | 5/2008 | |

OTHER PUBLICATIONS

Hirschberg et al., "Supramolecular Polymers from Linear Telechelic Siloxanes with Quadruple-Hydrogen-Bonded Units," Macromolecules, vol. 32, No. 8, 1999, pp. 2696-2705.

International Search Report mailed Oct. 24, 2005 for PCT/NL2005/000497, 3 pages.

Lange et al, "Hydrogen-Bonded Supramolecular Polymer Networks," J. Polym Sci. Part A, vol. 37, 1999, pp. 3657-3670.

Sijbesma et al., "Reversible Polymers Formed from Self-Complementary Monomers Using Quadruple Hydrogen Bonding," Science, vol. 278, Nov. 28, 1997, pp. 1601-1604.

Brunsveld, L et al., "Supramolecular Polymers", Chemical Reviews, vol. 101, 2001, pp. 4071-4097, XP002267453.

Chemical Abstract, vol. 85, Abst. No. 15348y, Jul. 1976, 1 Page.

Chemical Abstracts, Vo. 97, No. 10, Sep. 1982, Veselovskii et al., "Adhesive Composition," Inst. of the Chemistry of High Molecular Weight Compounds, Mar. 5, 1979, 1 Page.

Chemical Abstracts, vol. 80, No. 20, May 20, 1974, English abstract of JP 04 829398, filed Aug. 28, 1968, 1 Page.

CRC Handbook of Chemistry & Physics, 59th Ed., 1978-1979, CRC Press, Inc., p. E-61, with a total of 3 pages.

Derwent 91-179975125, 1 Page, of EP 433188, Jun. 1991.

El-Ghayoury et al., "Supramolecular Hydrogen-Bonded Oligo(p-phenylene vinylene) Polymers," Angew. Chem. Intl. Ed., vol. 40, No. 19, 2001, pp. 3660-3663. XP002260390.

Flory, P.J., "Random Reorganization of Molecular Weight Distribution in Linear Condensation Polymers," J. Am. Chem. Soc., 1942, vol. 64, pp. 2205-2212.

Guan et al., "Modular Domain Structure: A Biomimetic Strategy for Advanced Polymeric Materials," J. Am. Chem. Soc., vol. 126, 2004, pp. 2058-2065.

Guan et al., "Synthesis and Single-Molecule Studies of Modular Polymers Using Precise Hydrogen Bonding Interactions," Polymer-Preprints, vol. 44(2), 2003, pp. 485-486.

Hirschberg et al., "Ureidotriazine-Based Supramolecular Copoloymers" Macromolecules, vol. 36, 2003, pp. 1429-1432.

Kato T., "Supramolecular Liquid Crystal Polymers, Formation of Molecular Self-Organized Structures and Their Functionalization," Kobunshi Ronbunshu, vol. 54(12), 1997, pp. 855-862.(Abstract on last page).

Kautz et al., "Cooperative End-to-End and Lateral Hydrogen-Bonding Motifs in Supramolecular Thermoplastic Elastomers," Macromolecules, vol. 39, 2006, pp. 4265-4267.

Korshak et al., "Experimental Methods of Bulk Polymerization," Comprehensive Polymer Science: The Synthesis, Characterization, Reactions & Application of Polymers, vol. 5, 1989, Pergamon Press, pp. 131-142, 14 pages.

Lange et al., "Supramolecular Polymer Interactions Based on the Alternating Copolymer of Styrene and Maleimide," Macromolecules, vol. 28, 1995, pp. 782-783.

Lee et al., "Hydrogels for Tissue Engineering" Chem. Rev., vol. 101, No. 7, 2001, pp. 1869-1879.

Rieth et al., "Polymerization of Ureidopyrimidinone-Functionalized Olefins by Using Late-Transition Metal Ziegler-Natta Catalysts: Synthesis of Thermoplastic Elastomeric Polyolefins," Angew. Chem. Intl. Ed., vol. 40, No. 11, 2001, pp. 2153-2156.

Roland et al., "Synthesis of Titin-Mimicking Polymers Having Modular Structures by Using Noncovalent Interactions", Polymer Preprints, vol. 44(1), 2003, pp. 726-727.

Saunders et al. (editors), "Polyurethanes—Chemistry and Technology High Polymers: Part 1. Chemistry," High Polymers, vol. XVI-Part 1, 1962, Interscience Publishers a Division of Wiley & Sons, pp. 68-73.

Urbanski et al. "Potential Antimalarial Compounds. IX. Pyrimidine Derivatives of Urea and Guanidine", Journal of Medicinal Chemistry, vol. 10, 1967, pp. 521-525.

Yamauchi et al., "Thermoreversible Poly(alkyl acrylates) Consisting of Self-Complementary Multiple Hydrogen Bonding," Macromolecules, vol. 36, 2003, pp. 1083-1088.

Yamauchi et al., Abstract of "Synthesis and Characterization of Novel Multiple-Hydrogen Bonded Macromolecules Via A Michael Reaction," Dept. of Chemistry, Virginia Polytechnic Institute and State University. Aug. 2002.

Yamauchi, et al., "Thermoreversible Polyesters Consisting of Multiple Hydrogen Bonding (MHB)," Macromolecules, vol. 37, No. 10, 2004, pp. 3519-3522.

* cited by examiner

SUPRAMOLECULAR IONOMERS

FIELD OF THE INVENTION

The invention relates to supramolecular polymers. i.e. polymers having quadruple hydrogen bonding units (4H-units) within their structure, that also contain covalently attached ionic or ionogenic groups. These so-called supramolecular ionomers (or ionomeric supramolecular polymers) can be dispersed or solubilized in water at high solids contents while maintaining low viscosities, facilitating easy use and processing of the resulting aqueous formulations. The aqueous ionomer mixtures have excellent film-forming properties. Moreover, the polymer materials have good mechanical properties after drying, as they are not tacky, show high elasticity and low or no creep. The beneficial properties of the introduced polymer materials arise from the unprecedented action of both (i) ionic groups in the polymer structure and (ii) physical interactions between the polymer chains that are based on multiple hydrogen bonding interactions (supramolecular interactions based on 4H-units).

BACKGROUND OF THE INVENTION

This invention relates to supramolecular polymers that comprise self-complementary quadruple hydrogen bonding units (4H-units) that are capable of forming (at least) four H-bridges with other of such units leading to physical interactions between different polymer chains. Self-complementary hydrogen bonding units having at least four hydrogen bonds in a row, and thus capable of forming at least four hydrogen bonds, are in this patent application abbreviated as quadruple hydrogen bonding units, quadruple hydrogen bonding sites, 4H bonding units, 4H-units, 4H-elements or structural elements (4H) and are used in this patent application as interchangeable terms. Sijbesma et al. (U.S. Pat. No. 6,320,018; Science, 278, 1601; incorporated by reference herein) discloses such self-complementary units which are based on, particularly, 2-ureido-4-pyrimidones.

Telechelic polymers or trifunctional polymers have been modified with 4H-units (Folmer, B. J. B. et al., Adv. Mater. 2000, Vol. 12, 874; Hirschberg et al., Macromolecules 1999, Vol. 32, 2696; Lange, R. F. M. et al, J. Polym. Sci, Part A, 1999, 37, 3657-3670). However, these polymers have the 4H-unit coupled at the termini of the polymers, so the number of end groups is therefore limited to two, and the functional units are always located at the periphery of the polymer. Moreover, these polymers are not, or only poorly, water-soluble.

WO 02/46260 discloses polyurethane based polymers with 4H-bonding units as end-cappers and, optionally, with grafted 4H-bonding units; the disclosed polymers can be used as hot melt adhesive or TPU-foam. WO 03/099875 discloses polyurethane based polymers with 4H-bonding units as end-cappers that can be used as TPU-foam. Both patent applications use comparable or the same chemistry as described in Lange, R. F. M. et al, J. Polym. Sci, Part A, 1999, 37, 3657-3670, and are not water-soluble or dispersible.

WO 04/016598, incorporated by reference herein for the US patent practice, discloses polymers with grafted quadruple hydrogen bonding units. For example, polyacrylates and polymethacrylates with grafted 4H-units have been produced using different kinds of polymerization techniques. However, the 4H-units are not integrated in the backbone, and more importantly, no water soluble or water dispersible ionomers are disclosed.

WO 04/052963, incorporated by reference herein for the US patent practice, disclose polysiloxanes comprising 4H-units in the polymer backbone. However, these polymers do not contain ionic groups and are not water-soluble/dispersible.

WO 05/042641, incorporated by reference herein for the US patent practice, discloses polymers comprising 4H-units in the polymer backbone. However, these polymers do not contain ionic groups and are not water-soluble or dispersible.

US 2004/023155, incorporated by reference herein for the US patent practice, discloses a supramolecular polymer having the structure A-L-B, wherein A and B are polymers comprising a 4H-unit (in US 2004/023155 the 4H-unit is indicated by "QHB") which are linked by joining group L. The preparation of polymers A and B is said to be possible by reacting an appropriate polymer with a 4H-unit precursor having a terminal isocyanate group (in US 2004/023155 indicated by "QHBE"). According to US 2004/023155, an appropriate polymer would be a carboxyl substituted acrylic polymer such as a (co)polymer of acrylic acid. According to the examples (Examples 12 and 13), the 4H-units are grafted in a post modification step onto the carboxyl substituted acrylic polymers so that the 4H-units do not constitute an integral part of the polymer structure and are not present as terminal groups. US 2004/023155 further discloses that the appropriate polymer may be a polyurethane made from carboxyl functional diols, e.g. dimethylol propionic acid, and diisocyanates. Such polyurethanes comprising anionic groups would have a terminal OH-group that can me postreacted with the 4H-unit precursor having a terminal isocyanate group thereby providing a polyurethane comprising anionic groups which has a terminal 4H-unit. However, US 2004/023155 does not provide an enabling disclosure of such modified polyurethanes.

Because of environmental regulations governing the emission of volatile organic compounds (VOCs) into the atmosphere, the need for waterborne systems is emerging. General ways to obtain polyurethane ionomers, i.e. polyurethanes containing ionic groups that are dispersible or soluble in water, are for example described by Dieterich, D. et al., Angew. Chem., 1970, Vol. 2, page 53. In U.S. Pat. No. 3,480, 592 and U.S. Pat. No. 3,388,087, polyurethanes are disclosed that are water dispersible by the incorporation of cationic-groups in the polyurethane chain. In order to obtain elastic materials, however, these polyurethanes need to be chemically cross-linked or of high molecular weight. Especially the cross linked materials can hardly be processed, if at all.

The present invention discloses polymers that not only contain 4H-units in their molecular structure, but also ionic or ionogenic groups. It has surprisingly been found that the presence of cationic or anionic groups in the polymer chain does not disturb the supramolecular hydrogen-bonding interactions between different 4H hydrogen bonding units. Nor does the presence of the apolar 4H-units hinder the water solubility or dispersibility of the resulting polymers. Even more surprising is the fact that the possible remaining water molecules in the dried materials do not corrupt the hydrogen-bonding interactions and that therefore the resulting waterborne materials still display unique material properties, because of the reversible nature of the H-bonding interactions between the polymer chains. Thus, the present invention enables the manufacture of elastic, non-tacky polymers with excellent film-forming properties that can easily be processed or applied, by example spraying, from high solid content—yet still low viscosity—water dispersions (or solutions). The described polymers are of relatively low molecular weight, thereby circumventing the use of hardly processable high molecular weight or cross-linked materials.

SUMMARY OF THE INVENTION

The present invention provides supramolecular ionomers comprising (i) a quadruple hydrogen bonding unit (4H-unit) and (ii) an ionic group within the polymer structure. The present invention also provides a process for the preparation of supramolecular ionomers, aqueous formulations comprising a supramolecular ionomer and the use of such ionomers in a wide variety of applications.

DETAILED DESCRIPTION OF THE INVENTION

In this patent applications, ionic groups are to be understood as organic groups that are positively or negatively charged, i.e. that they can be cationic or anionic in nature. Precursors of the supramolecular ionomers according to the invention include monomers that can be polymerized to the supramolecular ionomers per se, but also monomers that can be polymerized to a supramolecular polymer comprising a quadruple hydrogen bonding units and an ionogenic group, wherein the ionogenic group is to be understood as a group being capable of the formation of an ionic group. As will be apparent to the person skilled in the art, the conversion of ionogenic groups into ionic groups may be performed during polymerization, but also after the termination of the polymerization in a subsequent step. Consequently, when in this patent application reference is made to a "supramolecular ionomer", this term also includes supramolecular polymers wherein the ionic group or ionic groups are still in a "protected form", i.e. that they are present as ionogenic groups.

According to the invention, the supramolecular ionomers have a relatively low number average molecular weight of about 2000 to about 200000, preferably about 5000 to about 60000, most preferably about 7000 to about 30000. The number average molecular weights of the supramolecular ionomers (e) according to the present invention are determined by size-exclusion chromatography (SEC) also known in the art as gel permeation chromatography (GPC) and are relative to polystyrene standards.

According to the invention, the supramolecular ionomers (e) have the following general structure:

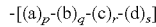

wherein (a) is a monomeric unit comprising at least one quadruple hydrogen bonding unit (4H-unit); (b) a macromonomeric unit; (c) a monomeric unit comprising an ionic group; (d) is a reactive monomeric unit, wherein (a), (b), (c), and (d) are covalently bonded in the polymer structure, or more preferably, in the polymer backbone. Additionally, p, q, r and s indicate the total number of units of (a), (b), (c) and (d), respectively, in the polymer backbone, wherein: p is 1 to 200, preferably 2 to 50 and most preferably 3 to 20; q is 0 to 200, preferably 2 to 50 and most preferably 3 to 20; r is 1 to 200, preferably 2 to 75 and most preferably 4 to 30; and s is 0 to 200, preferably 2 to 75 and most preferably 4 to 30. That is that according to a preferred embodiment the supramolecular ionomer comprises a monomeric unit (a), a monomeric unit (c) and a component selected from the group consisting of macromonomeric unit (b) and reactive monomeric unit (d). According to a more preferred embodiment of the invention, the supramolecular ionomer comprises a monomeric unit (a), a macromonomeric unit (b), a monomeric unit (c) and a reactive monomeric unit (d).

According to the present invention, the preparation of the supramolecular ionomers involves a chain extension reaction of a monomeric unit (a) comprising a (precursor of a) 4H-element, with a monomeric unit (c) comprising an ionic and/or ionogenic group. As explained above, the ionogenic group may be converted into the ionic group during this chain extension reaction or after the chain extension reaction in a separate step. Likewise, monomeric unit (a) may comprise a precursor of a quadruple hydrogen bonding unit that is converted into the 4H-unit during polymerization or afterwards in a separate step. In this patent application the precursor of a quadruple hydrogen bonding unit is denoted as a 4H*-unit. Consequently, where in this patent application reference is made to a 4H-unit, this term generally and where appropriate also includes a precursor of a 4H-unit, said precursor being indicated as 4H*-unit.

The molecular structure of the supramolecular ionomer according to the present invention may vary considerably. At one extreme, components (a), (c) and optionally (b) and (d), preferably (a)-(d), can be randomly distributed along the polymer chain. However, at the other extreme, these components can also be alternating—so that a strictly segmented polymer is obtained—in any permutation thinkable. Examples of such structures are:

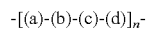

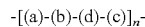

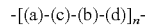

etc., wherein n is the number of repeats of the component sequence. Other sequences of components (a), (b) (c) and (d), that are not strictly random or not strictly alternating are obviously also possible as will be apparent to the polymer scientist skilled in the art.

The supramolecular ionomers according to the present invention comprise self-complementary quadruple hydrogen bonding units (4H-elements or 4H-units) in the polymer structure as well as ionic groups. The amount of 4H-units incorporated in the polymer structure, as calculated by dividing the employed total amount of moles of (a) by the employed total amount of moles of (a), (c) and (b) plus (d) if (b) and (d) are present, is preferably about 5 to about 50 mol %, more preferably about 10 to about 40 mol %, and most preferably about 15 to about 30%.

The amount of ionic groups incorporated in the polymer structure, as calculated by dividing the employed total amount of moles of (c) by the employed total amount of moles (a), (c) and (b) plus (d) if (b) and (d) are present, is preferably about 5 to about 50 mol %, more preferably about 10 to about 40 mol %, and most preferably about 20 to about 35 mol %.

The supramolecular ionomer (e) of this invention comprises as many ionic or ionogenic groups as is necessary to make the polymer processable (dispersible or soluble) in water or in aqueous mixtures. The dispersions or solutions can be made by any method known in the art, such as for example the acetone process, the pre-polymer mixing process, the melt emulsification process, or the ketimine-ketazine process (see Ullmann's Encyclopedia of Industrial Chemistry, Volume A21, pages 677-680, 5$^{th}$ Ed., VCH, Weinheim—Polyurethanes for more information on such processes).

Description of the Reactive Groups ($F_i$)

As explained above, the preparation of the supramolecular ionomers according to the present invention proceeds by a chain extension reaction of a monomeric unit (a) comprising a (precursor of a) 4H-element, with a monomeric unit (c) comprising an ionic and/or ionogenic group. However, it is preferred that the supramolecular ionomers are prepared from (a), (b) and (c) or (a), (c) and (d). It is even more preferred that the supramolecular ionomers are prepared from (a)-(d).

Components (a)-(d) are coupled to each other via reactive groups that are denoted as reactive groups ($F_i$), wherein i denotes the number of reactive groups. The reactive group ($F_i$) that is present in the components (a)-(d) can be any functional group that is reactive towards another (complementary) functional group, as is evident for persons skilled in the art of polymer or organic chemistry.

In this patent application the terms "reactive group" and "complementary reactive group" are denoted as ($F_i$) and are used interchangeably to indicate the reactive groups that are present in (a)-(d). Complementarity of two or more reactive groups is to be understood as reactive groups that are capable to form covalent bonds with each other under conventional reaction conditions, as will be apparent to a person skilled in the art. Preferred examples of (sets of) reactive groups that are complementary are:

hydroxyl groups and isocyanate groups that can form urethanes;
amino groups and isocyanate groups that can form ureas;
hydroxyl groups, amino groups and isocyanate groups that can form urethanes and ureas;
carboxyl derivatives and hydroxyl groups that can form esters;
carboxyl derivatives and amino groups that can form amides; and
carboxylic acids and isocyanate groups that can form amides.

The reactive groups ($F_i$) and preferences for these groups will be further specified in this patent application further below. Preferably, the reactive group ($F_i$) is a functional group that comprises an active hydrogen atom. In particular, preferred functional groups ($F_i$) are selected from the group consisting of hydroxyl, thiol, carboxylic acid, (activated) carboxylic ester, carboxylic acid halide, (blocked) isocyanate, (blocked) thioisocyanate, (activated) primary or secondary amine, vinyl, (meth)acrylate, or halogen groups.

More preferred reactive groups ($F_i$) are selected from the group consisting of hydroxyl, thiol, carboxylic acid, (activated) carboxylic ester, (blocked) isocyanate, (blocked) thioisocyanate, and (activated) primary or secondary amine groups.

Even more preferably, the reactive groups ($F_i$) are selected from the group consisting of hydroxyl, primary amine, isocyanate, carboxylic acid, and carboxylic ester groups.

Most preferably, the reactive groups ($F_i$) are selected from the group consisting of hydroxyl, primary amine and isocyanate groups.

In this patent application, "hydroxy" denotes a —OH group.

A "thiol" denotes a —SH group.

A "carboxylic acid" denotes a —C(O)OH group.

A "carboxylic ester" denotes a —C(O)OR group, wherein R is selected from the group consisting of $C_1$-$C_6$ alkyl, $C_6$-$C_{12}$ aryl, $C_7$-$C_{12}$ alkaryl and $C_7$-$C_{12}$ alkylaryl groups, wherein the alkyl groups may be linear, branched or cyclic.

A "carboxylic acid halide" denotes a —C(O)X group, wherein X is a chlorine atom, a bromine atom or an iodine atom.

An "isocyanate" denotes a —NCO group.

A "blocked isocyanate" denotes a —NHC(O)R* group, wherein R* is a leaving group. Suitable examples of leaving groups are halides, phenol and thiophenol derivatives, cyclic groups such as caprolactam groups, heterocyclic five or six membered rings comprising 1-3 heteroatoms selected from O, S and N such as for example imidazole, hydroxy-succinimide groups, ester derivatives such as the methyl ester of hydroxy-benzoic acid, alcohol derivatives such as 2-ethylhexyl-alcohol and t-butyl-alcohol, oxime derivatives such as methyl-ethyl ketoxime.

A "thioisocyanate" denotes a —NCS group.

An "blocked thioisocyanate" denotes a —NHC(S)R* group, wherein R* is a leaving group as indicated for "blocked isocyanate".

A "primary amine" denotes a —$NH_2$ group.

A "secondary amine" denotes a —NHR group, wherein R is selected from the group consisting of $C_1$-$C_6$ alkyl, $C_6$-$C_{12}$ aryl, $C_7$-$C_{12}$ alkaryl and $C_7$-$C_{12}$ alkylaryl groups, wherein the alkyl groups may be linear, branched or cyclic [as described above for the "carboxylic ester" group].

An "activated amine" denotes a —C(R)=NOH group (that can be converted into an amine group via the Beckmann rearrangement), a —C(O)$N_3$ group (that can be converted into an amine group via the Curtius rearrangement), a —C(O)$NH_2$ group (that can be converted into an amine group via the Hofmann rearrangement), a —NHC(O)R* group wherein R is a leaving group as defined above for "blocked isocyanate". According to the present invention, the "activated amine" preferably denotes a —NHC(O)R* group with R* being an imidazole, caprolactam or hydroxy succinimide group.

As explained above, the supramolecular ionomer according to the present invention may have different structures. In practice, the sequence of the components (a)-(d) will be governed by the complementarity of the reactive groups ($F_i$) in the respective components, and thus a somewhat segmented polymer may be obtained. For example, if components (b) and (c) are diols and components (a) and (d) are diisocyanates, the resulting supramolecular ionomer (e) will have the structure: $[(a) or (d)]_v$–$[(b) or (c)]_w$ with v and w the number of components (a)+(d) and (b)+(c) in the ioniomeric material, respectively.

According to the invention, all four components (a)-(d) have preferably two reactive groups ($F_i$) that enable coupling to one or more of the other components—i.e. the reactive groups in the four components (a)-(d) are complementary—to produce the supramolecular ionomers (e) of this invention.

However, other numbers of reactive groups (e.g. 1, 3, 4) in either of the components (a), (b), (c) and/or (d) are part of this invention as well, as this allows for branched and/or capped ionomeric materials. A component bearing only one reactive group also gives the opportunity to control and tune the molecular weight of the ionomeric material. Different types of monomeric units (a), macromolecular units (b), monomeric units (c), and reactive compounds (d) can be used in one synthetic procedure. For example, several macromolecular units (b) can be employed wherein the macromolecular units (b) are of a different chemical nature and/or of a different molecular weight, or different monomeric units (c) can be employed wherein the monomeric units (c) are of a different chemical nature and/or bear opposites charges, or different reactive compounds (d) can be used wherein the reactive groups in these compounds are of a different chemical nature.

Description of the Monomeric Unit (a)

Monomeric unit (a) comprises a 4H-unit and several reactive groups linked to or part of this unit, wherein these reactive groups can form covalent bonds upon reaction with one or more of the other components (b)-(d). In general, monomeric unit (a) can be represented by the formulae (I) or (II),

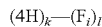
(I)

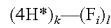
(II)

wherein 4H represents a structural element (4H); 4H* represents a precursor of the structural element (4H); $F_i$ represents a reactive group that is linked to the structural element (4H) or it represents a reactive group that is linked to or part of the precursor of the structural element (4H), i.e. (4H*); k represents the number of (precursors of) structural elements (4H) that is present in monomeric unit (a); and l represents the number of reactive groups that is present in monomeric unit (a). According to the invention, k is 1 to 4 and l is 1 to 4.

Preferably, k is 1 and l is 1 or 2. More preferably k is 1 and l is 2 and monomeric unit (a) is then represented by formulae (III) or (IV):

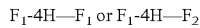
(III)

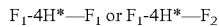
(IV)

According to this preferred embodiment of the invention, monomeric unit (a) contains only one (precursor of a) structural element (4H), and it contains two reactive groups that are of the same ($F_1$) or of a different type ($F_1$ and $F_2$). The reactive groups $F_1$ and $F_2$ are linked to the structural element (4H) or are linked to or part of the precursor of the structural element (4H).

The reactive groups ($F_i$) are described and defined in the previous section, and are in this case of monomeric unit (a) most preferably a hydroxyl, primary amine, isocyanate, carboxylic acid or carboxylic ester derivative, and most preferably a hydroxyl, primary amine or isocyanate group.

In general, the structural element that is capable of forming at least four hydrogen bridges (4H) has the general form (1') or (2'):

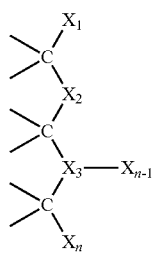
(1')

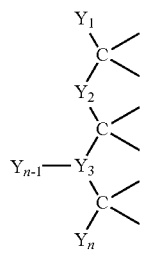
(2')

If the structural element (4H) is capable of forming four hydrogen bridges, which is preferred according to the invention, the structural element (4H) has preferably the general form (1) or (2):

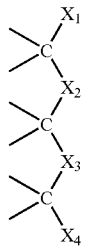
(1)

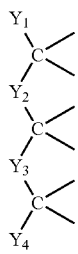
(2)

In all general forms shown above the C—$X_i$ and C—$Y_i$ linkages each represent a single or double bond, n is 4 or more and $X_1 \ldots X_n$ represent donors or acceptors that form hydrogen bridges with the H-bridge-forming unit containing a corresponding structural element (2) linked to them, with $X_i$ representing a donor and $Y_i$ an acceptor or vice versa. Properties of the structural element having general forms (1'), (2'), (1) or (2) are disclosed in U.S. Pat. No. 6,320,018 which for the US practice is incorporated herein by reference.

The structural elements (4H) have at least four donors and/or acceptors, preferably four donors and/or acceptors, so that they can form in pairs at least four hydrogen bridges with each another. Preferably, the structural elements (4H) have at least two successive donors, followed by at least two successive acceptors, preferably two successive donors followed by two successive acceptors, preferably structural elements according to general form (1'), or more preferably according to (1) with n=4, in which $X_1$ and $X_2$ both represent donors or acceptors, respectively, and in which $X_3$ and $X_4$ both represent acceptors or donors, respectively. According to the invention, the donors and acceptors are preferably O, S, and N atoms.

Molecules that can be used to construct the structural element (4H) are nitrogen containing compounds that are reacted with isocyanates, thioisocyanates or activated amines, or that are activated to give an activated amine that is then reacted with primary amines, to obtain a urea or thiourea moiety that is part of the quadruple hydrogen bonding site. Methods of preparing such structural units are well known in the art. The nitrogen containing compound is preferably a pyrimidine or a triazine derivative. More preferably, the nitrogen containing compound is an isocytosine or a thio-isocytosine derivative (i.e. a 2-amino-4-hydroxy-pyrimidine or a 2-amino-4-mercapto-pyrimidine derivative) or a triazine derivative, or a tautomer and/or enantiomer of these derivatives. More preferably, the nitrogen containing compound is an isocytosine derivative having a proton or aliphatic-substituent containing a functional group in the 5-position and an alkyl-substituent in the 6-position, most preferably 2-hydroxy-ethyl or a 3-propionic acid ester in the 5-position and methyl in the 6-position, or hydrogen in the 5-position and methyl in the 6-position. The isocyanates or thioisocyanates that are reacted with the nitrogen containing compound can be monofunctional or bifunctional (for example alkyl or aryl (di)(thio)isocyanate(s)), and are preferably bifunctional. The primary amine can be of any kind (aromatic, aliphatic) and may contain other functional groups in its structure, such as another amine function, an alcohol, an ester or a carboxylic acid function.

According to the invention, monomeric unit (a) comprising the structural element (4H) is particularly suitably represented by the compounds having the general formulae (3) or (4), and tautomers and/or enantiomers thereof (see below). Monomeric unit (a) comprising a precursor of the structural element (4H), i.e. (4H*), is particularly suitably represented by the compounds having the general formulae (5) or (6). The X in formulae (4) and (6) is preferably a nitrogen atom, but it can also be a carbon atom with an attached R4-group.

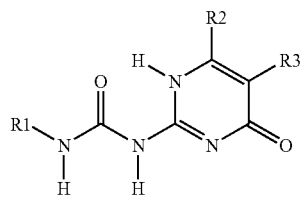
(3)

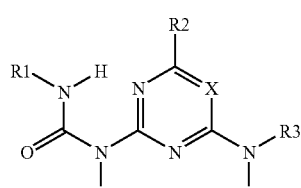
(4)

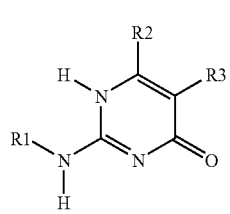
(5)

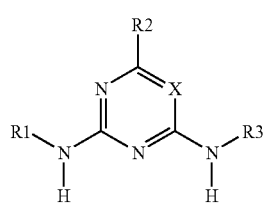
(6)

R1, R2, R3 and R4 may independently be a hydrogen or all kinds of shorter or longer chains, for example, saturated or unsaturated, branched, cyclic or linear alkyl chains, aryl chains, alkaryl chains, alkylaryl chains, ester chains, ether chains and any chain of atoms used in traditional (polymer) chemistry, whether or not substituted with one or more functionalities, such as (thio)ureas or thio(urethanes), and whether or not substituted with one or more reactive group(s) ($F_i$), such as (blocked) isocyanates, (blocked) thio-isocyanates, primary, secondary or tertiary hydroxyl groups (i.e. alcohols), primary, secondary, tertiary or quaternary amines, activated amines, (thio)phenols, thiols, (activated) esters and carboxylic acids. R1, R2, R3 and R4 may also directly constitute one of these or other functionalities or reactive groups ($F_i$).

Preferably, "saturated or unsaturated, branched, cyclic or linear alkyl chains" denote a $C_1$-$C_{10}$ alkylene group.

"Aryl chains" preferably denote a $C_6$-$C_{12}$ arylene group.

"Alkaryl chains" and "alkylaryl chains" preferably denote a $C_7$-$C_{12}$ alkaryl group and a $C_7$-$C_{12}$ alkylaryl group, respectively.

"Ester chains" preferably denote a polyester obtained by ring opening polymerisation of $C_4$-$C_8$ lactones or dilactides or glycolides having the general formula:

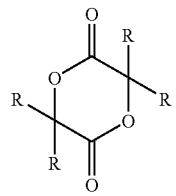

wherein the R groups are independently selected from the group consisting of linear or branched $C_1$-$C_6$ alkyl groups. However, it is preferred that for "ester chains" the R groups are independently selected from hydrogen atoms and methyl groups.

"Ether chains" preferably denote a polyether chain comprising ethylene oxide and/or propylene oxide, wherein the polyether chain is represented by the formula:

—(CR*H—CR*H—O)$_w$— wherein R* can be a hydrogen atom or a methyl group and w is in the range of 1-100, preferably 1-20.

Preferably, if any one of R1, R2, R3 and R4 is part of or constitutes a reactive group ($F_i$) or if it comprises one or more reactive group(s) ($F_i$), and it therefore links the (precursor of the) structural element (4H) to the reactive group(s) ($F_i$), said linking moiety is a hydrogen, a chemical bond or a $C_1$-$C_{12}$ straight chain, a branched alkylene group, a $C_6$-$C_{12}$ arylene, a $C_7$-$C_{12}$ alkarylene or a $C_7$-$C_{12}$ arylalkylene group, wherein the alkylene, arylene, alkarylene or arylalkylene group may be substituted with other groups or may contain cyclic groups as substituent or in the main chain. Examples of such groups are methylene, ethylene, propylene, tetramethylene, pentamethylene, hexamethylene heptamethylene, octamethylene, nonamethylene, 1,6-bis(ethylene)cyclohexane, 1,3,3-trimethyl-1-methylene-cyclohexane, 1,6-bismethylene benzene, etc. The alkylene, arylene, alkarylene or arylalkylene groups may be interrupted by heteroatoms, in particular heteroatoms selected from the group consisting of oxygen, nitrogen, and sulphur.

However, according to the invention, it is even more preferred that the structural elements (4H) or (4H*) in the compounds (3) and (4) or (5) and (6), respectively, are connected to two reactive groups ($F_i$) via one or two R groups of the series R1, R2, R3, R4 with the other R-group(s) representing independently random side chains or hydrogen atoms. According to the invention, the random side chain is preferably a $C_1$-$C_{12}$ alkyl group, most preferably methyl, 1-ethylpentyl or 2-ethylhexyl. According the present invention, the term "alkyl" when used in connection with the random side chain encompasses linear, branched and cyclic alkyl groups, but the random side chain is preferably a linear alkyl group.

Hence, for formula (3), the structural element (4H) is preferably connected to a reactive group ($F_1$) via R1 and to a reactive group ($F_1$) or ($F_2$) via R2, whereas R3 is a random side chain or a hydrogen atom; or the structural element (4H) is connected to a reactive group ($F_1$) via R1 and to a reactive group ($F_1$) or ($F_2$) via R3, whereas R2 is a random side chain or a hydrogen atom; or the structural element (4H) is bonded to two reactive groups ($F_i$) both via R1, whereas R2 and R3 are independently random side chains or hydrogen atoms. To indicate that the reactive groups ($F_i$) may be of a different type, they are specified as ($F_1$) or ($F_2$). Most preferably, for formula (3), one reactive group ($F_1$) is connected via R1 and one reactive group ($F_1$) or ($F_2$) is connected via R3, while R2 is a hydrogen or a random side chain as defined above.

Preferably, for formula (5), the structural element (4H*) is connected to a reactive group ($F_1$) via R1 and a reactive group ($F_1$) or ($F_2$) via R2, whereas R3 is a random side chain as defined above or a hydrogen atom, or the structural element (4H*) is connected to a reactive group ($F_1$) via R1 and to a reactive group ($F_1$) or ($F_2$) via R3, whereas R2 is a random side chain as defined above or a hydrogen atom. Most preferably, for formula (5), one reactive group ($F_1$) is connected via R1 and one reactive group ($F_1$) or ($F_2$) is connected via R3, while R2 is a random side chain as defined above or a hydrogen atom.

Preferred embodiments of monomeric unit (a) are,

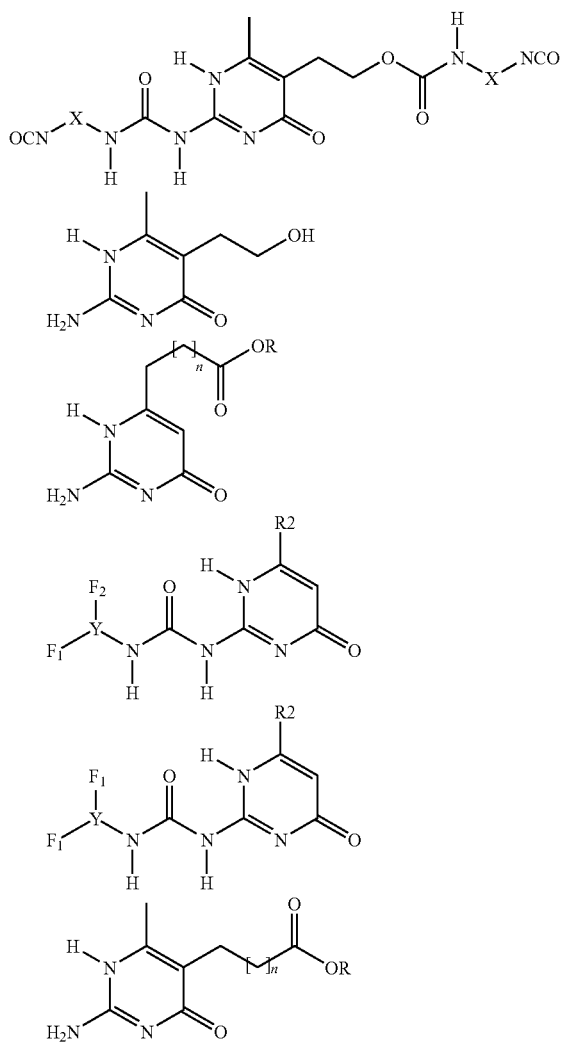

and tautomers or enantiomers thereof, wherein X is a linear, branched or cyclic $C_1$-$C_{16}$ alkyl group, a $C_6$-$C_{16}$ aryl group, a $C_7$-$C_{16}$ alkaryl or a $C_7$-$C_{16}$ alkylaryl group. Examples are: butyl, hexyl, 1-methylene-1,3,3-trimethyl-cyclohexane, 2,2,4-trimethylhexyl, 2,4,4-trimethylhexyl, 2,2,5-trimethyl-hexyl, toluoyl, methylene diphenyl or methylene dicyclohexyl. Preferably, n=0, 1 or 2, R is hydrogen, methyl or ethyl, Y is a short linear, branched or cyclic alkylene, arylene or alkylarylene spacer containing two to sixteen carbon atoms and that may contain heteroatoms such as N, S and O, $F_1$ and $F_2$ are reactive groups that are defined above and that preferably and independently selected from the group consisting of hydroxyl, primary amine, carboxylic acid and carboxylic ester groups. R2 is a random side chain as defined above.

Description of the Macromonomeric Unit (b)

Macromonomeric unit (b) can be any functional polymer or oligomer and can be represented in the following schematic form:

$$P\text{—}(F_i)_l \quad (V)$$

where P represents the polymer chain, $F_i$ represents the reactive groups in the macromonomeric unit (b) and l represents the number of reactive groups ($F_i$) in macromonomeric unit (b). In formula (V), l is 1 to 30, preferably 1 to 6. More preferably, l is 1 to 3, most preferably l is 2 so that (VII) can be written as:

$$F_3\text{—}P\text{—}F_3 \text{ or } F_3\text{—}P\text{—}F_4 \quad (VI)$$

According to this preferred embodiment, macromonomeric unit (b) comprises two reactive groups ($F_i$) that can be of the same ($F_3$) type or that can be of a different type ($F_3$ and $F_4$). The reactive or functional groups ($F_i$) have been described and defined above, and are in this case of macromonomeric unit (b) preferably hydroxyl, primary amine or isocyanate groups. P represents any polymer backbone, such as a polyether, polyester, polyamide, polyacrylate, polymethacrylate, polyolefin, hydrogenated polyolefin, polycarbonate, polysiloxane, perfluorinated polyether, or the like. P can also represent co-polymers of any kind. According to a preferred embodiment of the invention, P is selected from the group consisting of polyether, polyester, polycarbonate, polysiloxane or hydrogenated polyolefin. Most preferably, P is a polyester, a polyether or a hydrogenated polyolefin and even most preferably, P is a polyester. The number average molecular weight of the polymer P is in the range from about 100 to about 100000, more preferably from about 300 to about 50000, even more preferably from about 400 to about 20000, most preferably from about 500 to about 5000.

The macromonomeric unit (b) has therefore preferably a number average molecular weight of about 100 to about 100000, preferably about 300 to about 50000 and more preferably about 400 to about 20000 and most preferably about 500 to 5000.

Preferably, macromonomeric unit (b) is a polymer with hydroxyl groups as reactive groups, more preferably, a polymer with two hydroxyl end groups. Examples are α,ω-dihydroxy polyethers having a polyoxyalkylene chain and hydroxyl end-groups, such as α,ω-dihydroxy polyethylene glycol, α,ω-dihydroxy polypropylene glycol, α,ω-dihydroxy poly(ethylene-co-propylene)glycol, α,ω-dihydroxy poly(ethylene-co-propylene-co-ethylene)glycol, α,ω-dihydroxy polytetramethylene glycol, or α,ω-dihydroxy polyesters, such as α,ω-dihydroxy polycaprolactones, α,ω-dihydroxy polyadipates (e.g. hydroxy terminated poly(1,2-ethylene adipate), hydroxy terminated poly(1,4-butylene adipate), hydroxy terminated poly-(2-methyl-1,3-propylene adipate)), α,ω-dihydroxy polyglutarates (e.g. hydroxy terminated poly(1,4-butylene glutarate, hydroxy terminated poly(2-methyl-1,3-propylene glutarate)), α,ω-dihydroxy polyterephtalates, α,ω-dihydroxy polyphthalates (e.g. hydroxy terminated copolymers of phthalic acid (the term "phtalic acid" is to be understood as to include also the regioisomers of phtalic acid, i.e. homophtalic acid and terephtalic acid) and diethyleneglycol, hydroxy terminated copolymers of phthalic acid and 1,6-hexanediol or 1,4-butanediol), α,ω-dihydroxy polycarboxylates wherein the carboxylates are derived from aliphatic dicarboxylic acids containing 1-12 carbon atoms, the aliphatic moiety being linear, branched or cyclic and the aliphatic moiety optionally containing one or more unsaturated carbon carbon bonds, α,ω-dihydroxy polyisophthalates (e.g. hydroxy terminated copolymers of 5-NaSO$_3$-isoptalic acid, isophthalic acid, diethyleneglycol and bis-hydroxymethylene-cyclohexane, hydroxy terminated copolymers of isophtalic acid and 1,4-butanediol, hydroxy terminated copolymers of 5-NaSO$_3$-isophthalic acid, adipic acid, phthalic acid and 1,6-hexanediol), α,ω-dihydroxy polylactides, α,ω-dihydroxy polyglycolides, α,ω-dihydroxy poly (hydroxybutyrates), or α,ω-dihydroxy (hydrogenated) polyolefines, such as hydroxyl functionalized polybutadiene, hydroxyl functionalized poly(ethylene-butylene), or α,ω-dihydroxy polycarbonates such as poly(1,3-propanediol carbonate)glycols or poly(1,6-hexanediol carbonate)glycols, or α,ω-dihydroxy polysiloxanes, such as α,ω-bis(6-hydroxy hexyl)polydimethylsiloxanes, α,ω-bis(oligo-ethyleneoxide) polydimethylsiloxanes, or α,ω-dihydroxy-hydroxy polyamides.

Another preferred macromonomeric unit (b) is a polymer with primary amine reactive groups. Examples are Jeffamines® (polyoxyalkylene amines produced and marketed by Huntsman), or amino terminated polysiloxanes, such as α,ω-bis(3-amino propyl)polydimethylsiloxanes, or amino terminated aliphatic polyamides.

Another preferred macromonomeric unit (b) is a polymer with isocyanate reactive groups. These type of macromonomeric units (b) are usually derived from hydroxyl or amine functionalized polymers (see above for examples of these polymers) by reaction of these polymers with diisocyanates. Examples of and preferences for such diisocyanates are described below in the description of the reactive compound (d).

Description of the Monomeric Unit (c)

Monomeric unit (c) can be any functional molecule that comprises at least one ionic group, and can be represented by the following general formula:

$$(I)_k—(F_i)_l \quad (VII)$$

wherein I represents the ionic group, $F_i$ represent the reactive groups, k represents the number of ionic groups and l represents the number of reactive groups ($F_i$). Preferably, k is 1 to 3 and l is 1 to 5, and more preferably, k is 1 and l is 2, so that monomeric unit (c) is represented by formula (VIII):

$$F_5—I—F_5 \text{ or } F_5—I—F_6 \quad (VIII)$$

According to this preferred embodiment of the invention, the monomeric unit (c) comprises two reactive groups ($F_i$) that can be of the same ($F_5$) type or that can be of a different type ($F_5$ and $F_6$). The reactive or functional groups ($F_i$) are described and defined before, and are in this case of monomeric unit (c) preferably an hydroxyl or a primary amine group, most preferably a hydroxyl group.

As explained above, an ionogenic group is a precursor for an ionic group. Suitable ionogenic groups are for example (tertiary) amine, pyridine, carboxylic acid or carboxylic ester groups whereas suitable ionic groups are for example quarternary amine (ammonium derivatives which may be linear, branched or cyclic including compounds having a nitrogen atom in the ring, e.g. piperidinium), pyridinium, carboxylate, sulfonate and phosphate groups. Conversion from an ionogenic group to an ionic group is typically achieved by protonation or deprotonation. Alternatively, conversion is achieved by alkylation or saponification of the ionogenic group. Preferably, the ionic groups are selected from the groups that are derived from —N$^+$(R$^1$)$_4$X$^-$, —S(O)OH; —S(O)$_2$OH; —P(O)(R$^1$)(OH); —P(O)(OH)$_2$, wherein R$^1$ is independently selected from the group consisting of linear, branched or cyclic C$_1$-C$_{16}$ alkyl groups, C$_6$-C$_{16}$ aryl groups, C$_7$-C$_{16}$ alkaryl groups or C$_7$-C$_{16}$ alkylaryl groups and wherein X is the counter ion Y$^-$ defined below.

Monomeric units (c) comprising one or more nitrogen atoms can be used to obtain cationic ionomers (e). Monomeric units (c) comprising one or more nitrogen atom that can be used, are, for example, compounds of the following general molecular formulae:

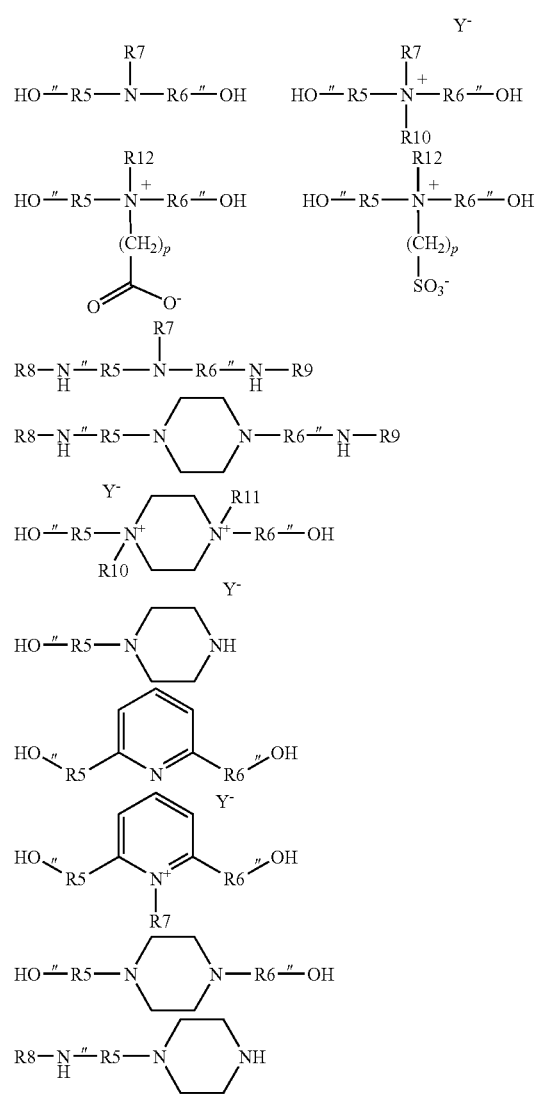

in which R5 and R6 are independently selected from the group consisting of linear, branched or cyclic C$_2$-C$_8$ alkyl groups, R7, R10, and R11 are independently selected from the group consisting of linear or branched C$_1$-C$_6$ alkyl groups, phenyl groups or (C$_1$-C$_4$)alkyl phenyl groups, R8 and R9 are independently selected from the group consisting of H or linear or branched C$_1$-C$_6$ alkyl groups, and R12 is selected from the group consisting of H, linear or branched C$_1$-C$_6$ alkyl groups, phenyl groups or (C$_1$-C$_4$)alkyl phenyl groups.

Preferably, p is 1, 2 or 3.

$Y^-$ can be any counter anion, but is preferably a chloride, bromide, iodide, phosphate ($PO_4^{3-}/3$), sulfate ($SO_4^{2-}/2$), [$C_1$-$C_6$]alkyl sulfate, [$C_1$-$C_6$]alkyl phosphate or [$C_1$-$C_6$]carboxylate.

Monomeric units (c) comprising sulfonate or carboxylate groups can be used to obtain anionic ionomers (e). Monomeric units (c) with sulfonate or carboxylate groups that can be used, are, for example, 2,2-bis(hydroxymethyl)-propionic acid, or compounds of the general formulae:

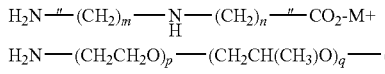
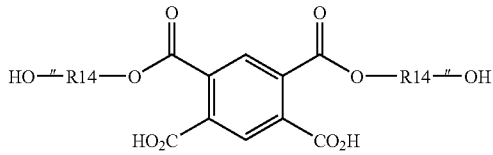
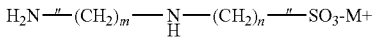
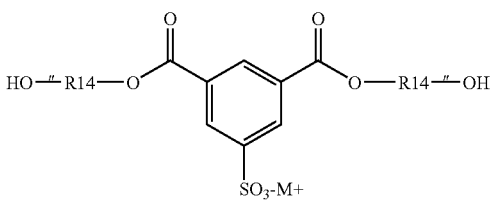

in which m and n are, independently an integer from 1 to 8, in particular from 1 to 6, M+represents a metal cation with any positive charge (i.e. $1^+$, $2^+$, $3^+$, 4+etc.), preferably a cation derived from an alkaline metal or an alkaline earth metal, more preferably $Li^+$, $Na^+$, or $K^+$, p and q are independently an integer from 0 to 50, with the proviso that p+q>0. The order of the alkylene oxide units is arbitrary, the molecular weight of the polyether-copolymers is preferably from about 400 to about 3000. R14 is preferably a $C_2$-$C_{18}$ linear, branched or cyclic alkylene group.

In a preferred embodiment of this invention, monomeric unit (c) is N-methyl-di-2-ethanolamine, 2,6-bis-(hydroxymethyl)-pyridine, 2,2-bis(hydroxymethyl)-propionic acid, or diesters of diols with the alkali salt of 5-sulfo isophthalic acid. More preferably, monomeric unit (c) is N-methyl-diethanolamine, 2,6-bis-(hydroxymethyl)-pyridine or 2,2-bis(hydroxymethyl)-propionic acid, most preferably monomeric unit (c) is N-methyl-diethanolamine.

Description of the Reactive Compound (d)

Reactive monomeric unit (d) is used in the polymerization reaction to balance or control the molar amounts of the complementary reactive groups in the reaction, such that the desired structure and molecular weight of polymer (e) is achieved. Although the use of reactive monomeric unit (d) is often required, its use is optional. The use of reactive monomeric unit (d) gives the opportunity to introduce extra functions or properties in ionomer (e). For example, reactive monomeric unit (d) may be a reactive (fluorescent) dye, a surface active ingredient, a UV-stabilizer, an anti-oxidant or any other chemical compound having a function.

Reactive monomeric unit (d) can be any functional compound and is represented by the general formula (IX):

  (IX)

wherein J is an organic moiety, $F_i$ is a reactive group as defined above and l is 1 to 5. More preferably, l is 1 or 2, most preferably 2. According to this preferred embodiment, reactive compound (d) is then represented by the general formula (X):

  (X)

wherein J is an organic moiety and $F_7$ and $F_8$ are reactive groups as defined above. Most preferably, J is a linear, branched, or cyclic alkylene group having 2 to 24 carbon atoms, preferably 4 to 18 carbon atoms.

The reactive groups ($F_i$) are preferably isocyanate, thioisocyanate, hydroxyl, primary amine, carboxylic acid or carboxylic ester groups. Most preferably, the reactive monomeric units (d) are diisocyanates. The diisocyanates most preferred in this invention, are those which are commonly used in polyurethane-synthesis and that are known in the art. Examples of suitable diisocyanates that can be used in this invention are:

1,4-diisocyanato-butane (BDI),
1,4-diisocyanato-4-methyl-pentane,
1,6-diisocyanato-2,2,4-trimethylhexane,
1,6-diisocyanato-2,4,4-trimethylhexane,
1,5-diisocyanato-5-methylhexane,
3 (4)-isocyanatomethyl-1-methylcyclohexyl isocyanate,
1,6-diisocyanato-6-methyl-heptane,
1,5-diisocyanato-2,2,5-trimethylhexane,
1,7-diisocyanato-3,7-dimethyloctane,
1-isocyanato-1-methyl-4-(4-isocyanatobut-2-yl)-cyclohexane,
1-isocyanato-1,2,2-trimethyl-3-(2-isocyanato-ethyl)-cyclopentane,
1-isocyanato-1,4-dimethyl-4-isocyanatomethyl-cyclohexane,
1-isocyanato-1,3-dimethyl-3-isocyanatomethyl-cyclohexane,
1-isocyanatol-n-butyl-3-(4-isocyanatobut-1-yl)-cyclopentane.
1-isocyanato-1,2-dimethyl-3-ethyl-3-isocyanatomethyl-cyclopentane,
3(4)-isocyanatomethyl-1-methylcyclohexyl isocyanate (IMCI),
toluene diisocyanate (TDI),
methylene diphenyl diisocyanate (MDI),
methylene dicyclohexane 4,4-diisocyanate (HMDI),
isophorone diisocyanate (IPDI),
α,α,α',α'-tetramethyl-1,3-xylylene diisocyanate (TMXDI), and
hexane diisocyanate (HDI).

More preferably, the diisocyanate is IPDI, HDI, BDI, MDI, TDI, TMXDI, 1,6-diisocyanato-2,2,4-trimethylhexane, 1,6-diisocyanato-2,4,4-trimethylhexane or methylene dicyclohexane 4,4-diisocyanate (HMDI).

Most preferably, the diisocyanate is IPDI, HDI, MDI, TMXDI or methylene dicyclohexane 4,4-diisocyanate (HMDI).

Description of the Preparation of Supramolecular Ionomer (e)

The polymers presented in this invention are obtainable by reacting monomeric unit (a) with monomeric unit (c) and optionally macromonomeric unit (b) and/or (d), most preferably by reacting monomeric unit (a) with (c)-(d). Obviously, the various reactive groups in the respective components must enable reaction with one or more of the other components to form covalent bonds (i.e. the reactive groups in the set of components are complementary). Thus, ionomer product (e) is preferably a co-polymer of the components (a)-(d) and has a quadruple hydrogen bonding unit (4H-unit) and an ionic group within the polymer structure.

According to the present invention, the components (a), (c), and optionally (b) and/or (d), preferably (a)-(d), are brought together and reacted in any desired ratio, fashion, or sequence to produce ionomer (e). The molar ratio in which the components are used, can be varied to a large extent, so that the structure and the molecular weight of the supramolecular ionomer (e) can be predetermined and controlled.

The polymerization reaction of the components (a), (c), and optionally (b) and/or (d), preferably (a)-(d), that produces ionomer (e) may be any kind of (polymerization) reaction known in the art, but preferably it involves reactions that are typical for the production of polyurethanes (PUR-chemistry) or polycondensates (polycondensations). For example, the four components have only hydroxyl or isocyanate reactive groups ($F_i$), or hydroxyl, primary amine and isocyanate groups, or hydroxyl, primary amine, carboxylic acid and isocyanate groups (PUR-chemistry), or have only hydroxyl and carboxylic acid or carboxylic ester groups, or hydroxyl, primary amine and carboxylic acid or carboxylic ester groups (polycondensation chemistry).

The production of polymer (e) may involve any kind of polymerization procedure or process known in the art of polymerization chemistry. Solution, bulk, suspension, and other types of polymerizations may be used; one-pot procedures or procedures involving a sequence of (polymerization) reactions may be used to produce polymers (e). Polymers (e) may also be produced in extrusion processes, in which the components are mixed in any desired sequence. The reaction temperature is in the range from about 20° to about 250° C., preferably from about 60° to about 150° C. The reaction can be carried out without solvent or in a suitable inert solvent or solvent mixture. Suitable solvents are aprotic polar solvents, such as tetrahydrofuran, dioxane, ethyl acetate, toluene, N-methylpyrrolidone, DMSO, and, preferably, ketones such as acetone, methyl ethyl ketone and methyl isobutyl ketone (MIBK). The reaction is preferably carried out under an inert-gas atmosphere such as nitrogen. The reaction is preferably carried out in the presence of a suitable catalyst known in the art in order to achieve the desired product; examples are dibutyltindilaurate, DABCO or Ti(IV)-alkoxides, such as Ti(IV) tetra-n-butoxide.

According to the invention, more than one type of monomeric unit (a) and/or type of macromonomeric unit (b) and/or type of ionic or ionogenic unit (c) and/or type of reactive monomeric unit (d) can be used in the polymerization reaction. Examples of this inclusion are:
1. The use of two or more types of macromonomeric units (b) that for example differ in number average molecular weight, in the structure of the main-chain and/or in the nature of the reactive groups;
2. The use of monofunctional species ('stopper'-molecules) of any one of the components (a), (b) (c) or (d); in formulae these 'stopper'-molecules can for example be denoted as: $4H-F_1$, $4H^*-F_1$, $P-F_3$ or as $I-F_5$ (see the previous sections for an explanation of these formulae). The procedure of adding 'stopper' molecules is well known in the art (cf. for example Flory, P. J.; J. Am. Chem. Soc. 1942, Vol. 64, p. 2205), and enables the control of the molecular weight and of the end-groups in the polymer product (e). A particular 'stopper' molecule $4H-F_1$ is for example 2-(3-(6-isocyanato-hexyl)-ureido-6-methyl-isocytosine. Other particular examples involve monofunctional reactive monomeric unitrs (d) that bear an extra function or property, such as for example color (e.g. a hydroxy functionalized dye, a thioisocyanate fluorescent dye, etc.);
3. The use two or more monomeric units (c) that differ in structure, charge and/or type of reactive groups, enabling, in particular, the charge distribution in the polymer product (e). In one embodiment of this invention, polymer (e) can have both acid groups and amino groups. The difference in number of acid groups and amino groups is preferably from about 15 to 150, more preferably from 30 to 100.

Aqueous Compositions

The aqueous compositions according to the invention comprises about 0.5 to about 40.0%, preferably about 1.0 to about 35.0% by weight of ionomer (e), based on the total weight of the aqueous composition. The ionomer (e) may me molecularly dissolved or be present as dispersed, charged nano-sized particles, preferably having an average size between about 10 and about 250 nm.

The ionomers (e) comprising acidic groups, i.e. anionic ionomers, can be neutralized partially or completely by using a base. As a rule, the resulting salts of the polymers have better dispersibility or solubility in water than the non-neutralized polymers. Bases that can be used for the neutralization of polymers (e) containing acidic groups are for example (aqueous solutions of) alkali metal bases, such as sodium hydroxide, potassium hydroxide, sodium carbonate, sodium hydrogen carbonate, potassium carbonate, potassium hydrogen carbonate and alkaline earth metal bases, such as calcium hydroxide, calcium oxide, magnesium carbonate, magnesium hydroxide, ammonia and amines. Amines suitable for (partial) neutralization are for example $C_1$-$C_6$-alkylamines, dialkylamines, trialkylamines, dialkylalkanolamines, such as di-$C_1$-$C_6$-alkylethanolamines, alkyldialkanolamines, such as $C_1$-$C_6$-alkyldiethanolamines, preferably methyl- or ethyl diethanolamine, trialkanolamines, such as triisopropanolamine, or a diamine like lysine. Obviously, the alkyl groups may be linear, branched or cyclic. More preferably, the amines are 2-amino-2-methyl-1-propanol (AMP), 2-amino-2-methyl-1,3-propanediol (AMPD), diethylaminopropyl amine, and triisopropanol amine. Neutralization of acid containing polymers (e) can also take place using mixtures of two or more bases, such as a mixture of sodium hydroxide and triisopropanolamine. Depending on the intended use, neutralization can be partial, for example up to 40%, or complete, for example up to 100%.

The polymers (e) containing neutral, protonated or quaternized amino groups are generally readily soluble in water without the aid of emulsifiers. Charged cationic groups can be obtained from (tertiary) amine nitrogens by protonation, for example by using carboxylic acids, such as lactic acid, or mineral acids, such as phosphoric acid, sulphuric acid and hydrochloric acid, or by quaternization, for example by using alkylating agents, such as $C_1$-$C_4$-alkyl halides or sulfates. Examples of such alkylating agents are methylchloride, methylbromide, ethylchloride, ethylbromide, dimethylsulfate and diethylsulfate. Preferably, charged cationic species are obtained by protonation.

The use of different monomeric units (c) in the preparation of ionomer (e) allows for tuning of the solubility and dispersibility of the ionomer as function of the pH of the aqueous solution in which the polymer is dispersed or solubilized. Ionic groups with $pK_a$'s in the range of 7 are soluble in neutral aqueous solution, whereas ionic groups with pKa's lower than 6 preferably need acidified water and ionic groups with pKa's greater than 8 preferably need alkaline water. Consequently, a person skilled in the art can convert clear aqueous solutions or dispersions of (e) to gels or turbid dispersions simply by changing the pH.

Aqueous formulations of the ionomers (e) can be applied to a substrate via spraying or any other method known in the art to apply a solution or dispersion to a substrate. In general, when the macromonomeric unit (b) has a glass transition temperature below 10° C., the resulting ionomers (e) have excellent film-forming properties. Optionally, plasticizers known in the art, such as aqueous dispersions of elastomeric polyethers or hydrophobic non-polymeric plasticizers, may be added to improve film forming at room temperature. Moreover, although the inventors do not wish to be bound by any scientific theory, it has been unexpectedly found that the presence of ionic groups in ionomer (e) results in a strong increase in adhesive properties of these polymers when compared to polymers consisting of only components (a), (b), and (d).

Applications

The (waterborne) ionomers according to the invention are in particular suitable for applications related to surface coatings used in applications with leather, leather imitates, textile, optical fibers, glass, paper and paint formulations, imaging technologies such as printing, stereo lithography, photography and lithography, biomedical applications, such as (bio-degradable) materials for controlled release of drugs, hydrogels for wound-dressings or tissue-engineering, tablet formulations, sizing agents, (thermo)reversible coatings, adhesive and sealing compositions, thickening agents, gelling agents, binders, and surfactant compositions.

EXAMPLES

The following examples further illustrate the preferred embodiments of the invention. When not specifically mentioned, chemicals are obtained from Aldrich.

Example 1

Preparation of Polymers (e) of this Invention

Table I shows examples of polymer materials (e) that have been prepared on a ca. 5 to 10 gram scale by reacting the components (a), (b), (c) and (d) in the given molar ratios, e.g. material B has been prepared by using a molar ratio of 0.86 (=ca. 6/7): 1:1:1 for components (a):(b):(c):(d). The polymers (e) have been obtained by reaction in dry chloroform in the presence of dibutyltindilaurate catalyst at an oil bath temperature of 60° C. under an argon atmosphere. The reaction was maintained for as long as NCO-groups were detected, as determined by FT-IR, but typically reactions were executed overnight with stirring. After completion, ethanol was added to the reaction mixture to scavenge traces of unreacted isocyanates. Polymers were isolated by precipitation into hexane and drying. The materials were analyzed with size exclusion chromatography (SEC) to assess their molecular weight relative to polystyrene standards using THF as eluent.

For component (a), IUI, a ureido-pyrimidone derived from 5-hydroxy-ethyl-isocytosine and 2 equivalents of isophorone diisocyanate (IDPI) was used. IUI is a mixture of (stereo) isomers, because IPDI exists in different (regio)isomers and because both isocyanate groups in IPDI are reactive towards to the amine and hydroxyl functions in 5-hydroxy-ethyl-isocytosine. Therefore, the structure shown below is just one of the possible isomers of component (a). For the preparation of polymer I, in addition to IUI, also the stopper molecule IU was applied (see one of its isomers below).

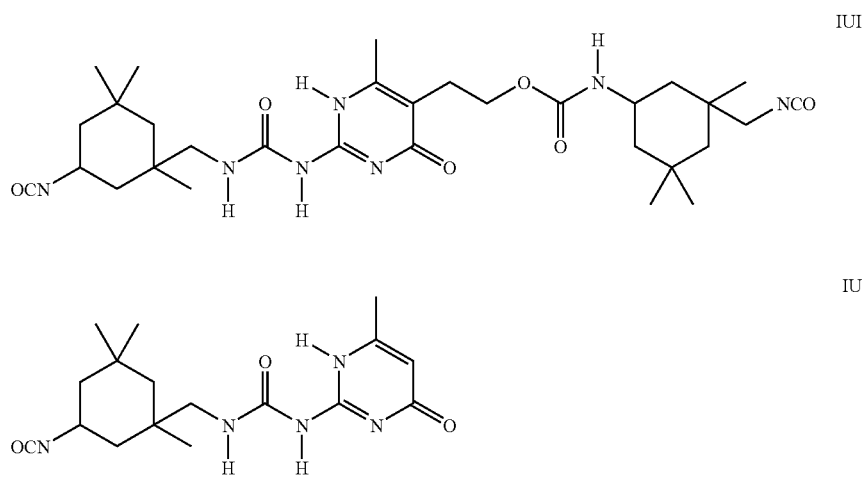

For component (b) have been used: poly-(2-methyl-1,3-propylene)adipate with hydroxy end groups and a molecular weight $M_n$ of 2000 (Poly-(2-MePr-Adp)-2000); poly-(2-methyl-1,3-propylene)glutarate with hydroxy end groups and a $M_n$ of 1020 (Poly-(2-MePr-Glu)-1000); poly-(diethyleneglycol)adipate with hydroxy end groups and a $M_n$ of 2500 (Poly-(DEG-Adp)-2500); all purchased from Aldrich. These polymers were dried before use by three-fold co-evaporation with dry toluene.

For components (c), N-methyl-diethanolamine (MDEA), 1,4-bis-(2-hydroxyethyl)piperazine (BHEPip) or 2,2-bis(hydroxymethyl)-propionic acid (DMPA) have been used. For component (d), IPDI was optionally used.

TABLE I

Preparation of polymers (e) by reaction of the components in the given molar ratios.

| Material | Component (a) 4H-unit | mol ratio | Component (b) Telechelic OH-functional Polymer | mol ratio | Component (c) ionogenic Group | mol ratio | Component (d) reactive group | mol ratio | $M_n$ (kD)[1] |
|---|---|---|---|---|---|---|---|---|---|
| A | IUI | 1.60 | Poly-(2-MePr-Adp)-2000 | 1.00 | BHEPip | 1.00 | IPDI | 0 | 8.1 |
| B | IUI | 0.86 | Poly-(2-MePr-Adp)-2000 | 1.00 | BHEPip | 1.00 | IPDI | 1.00 | 18.2 |
| C | IUI | 1.00 | Poly-(2-MePr-Adp)-2000 | 1.00 | MDEA | 1.00 | IPDI | 1.00 | 17.2 |
| D | IUI | 0.86 | Poly-(2-MePr-Adp)-2000 | 1.00 | MDEA | 1.00 | IPDI | 1.00 | 15.0 |
| E | IUI | 1.00 | Poly-(2-MePr-Adp)-2000 | 1.00 | MDEA | 2.00 | IPDI | 2.00 | 19.4 |
| F | IUI | 0.86 | Poly-(2-MePr-Adp)-2000 | 1.00 | MDEA | 2.00 | IPDI | 2.00 | 24.6 |
| G | IUI | 0.86 | Poly-(2-MePr-Glu)-1000 | 1.00 | MDEA | 2.00 | IPDI | 2.00 | 8.7 |
| H | IUI | 0.86 | Poly-(DEG-Adp)-2500 | 1.00 | MDEA | 2.00 | IPDI | 2.00 | 9.7 |
| I[2] | IUI | 0.80 | Poly-(2-MePr-Adp)-2000 | 1.00 | DMPA | 0.60 | IPDI | 0.60 | 10.1 |
| J[3] | IUI | 0.86 | Poly-(2-MePr-Adp)-2000 | 1.00 | — | — | — | — | 16.5 |
| K[3] | — | — | Poly-(2-MePr-Adp)-2000 | 1.00 | MDEA | 1.00 | IPDI | 1.86 | 23.2 |

[1]molecular weight in kiloDalton as determined with SEC relative to PS-standards
[2]for this polymer also 0.4 mol ratio of IPDI-UPy stopper component (a) was used
[3]examples for comparison For components (c), N-methyl-diethanolamine (MDEA), 1,4-bis-(2-hydroxyethyl)piperazine (BHEPip) or 2,2-bis(hydroxymethyl)-propionic acid (DMPA) have been used.

For component (d), IPDI was optionally used.

Example 2

Preparation of Aqueous Mixtures of Polymers (e)

Materials A, B, C, D, E, F, G, and H, can be dispersed in water by first dissolving them in THF, or alternatively, by directly using the reaction mixture with the polymers (e) when the solvent for reaction is THF or a ketone. To this THF solution, an HCl-solution in water is added in such a way that 0.95 equivalents of the tertiary amines become protonated; the protonation yields polymers $A(H^+)$—$H(H^+)$. Evaporating the THF for a prolonged time at 40° C., and applying such a vacuum that the water is not evaporated, gives aqueous mixtures that are low viscous, when containing up to at least 20 w/w % polymer material. Transparent, milky blue or milky white dispersions can be obtained. For example, polymers $F(H^+)$ and $G(H^+)$ give low viscous blueish mixtures at a 20 w/w % concentration in water, while polymer $H(H^+)$ gives a low viscous and more transparent mixture and polymer $D(H^+)$ gives a low viscous more milky-white mixture at the same concentration levels in water. Homogeneous aqueous mixtures of polymers (e) prepared at 30 w/w % concentration levels are also transparent, milky blue or milky white, but these mixtures show increased viscosities when compared to the 20 w/w % solutions.

The above described aqueous mixtures, possibly with added ingredients wanted for the specific application that are solubilized or dispersed in water, can be used directly in formulations that can be sprayed and applied on surfaces of choice.

Example 3

Properties of the Prepared Polymers (e)

The polymers (e) A-I in Table I have excellent film-forming properties when casted or sprayed on a surface from organic solvents. Also the aqueous mixtures of the protonated polymers, designated with $A(H^+)$—$H(H^+)$, as prepared by the procedure given in Example 2 can be casted or sprayed to give films. Some films have been examined with respect to their mechanical properties and their thermal properties. Results are shown in the Table II; given are the Young's modulus ($E_{mod}$), the yield stress ($\sigma_{yield}$) and the elongation at break ($\epsilon_{break}$), that is defined as $(L_{atbreak}-L_0)/L_0*100\%$, with $L_0$ being the length of the narrow middle part of the dog-bone-shaped testing bar before elongation and $L_{atbreak}$ being the length of the narrow part of the dog bone at the elongation of break.

TABLE II

Mechanical testing data and thermal properties of several polymer materials (e).

| | Mechanical Properties (average values of more tests) | | | | Thermal Properties | |
|---|---|---|---|---|---|---|
| Material | $E_{mod}$ (MPa) | $\sigma_{yield}$ (MPa) | $\epsilon_{break}$ (%) | Tensile Set (TS in %) | Tg (° C.) | Tm (° C.) |
| A | 15.7 | 2.1 | 290 | n.d. | n.d. | n.d. |
| $A(H^+)$ | 51 | 4.1 | 180 | n.d. | n.d. | n.d. |
| B | 4.9 | 0.7 | 790 | n.d. | −32 | — |
| $B(H^+)$ | 14 | 2.0 | 700 | n.d. | −37 | — |
| D | 2.7. | 1.1. | 1150. | 17 | −32 | — |
| $D(H^+)$ | 6.5 | 1.1 | 570 | 34 | −39 | — |
| F | 5.3 | 0.6 | 800 | 33 | −31 | — |
| $F(H^+)$ | 37 | 2.5 | 700 | 51 | −37 | 71 |
| G | 13 | 1.0 | 430 | 14 | −4 | — |
| $G(H^+)$ | 179 | 9.5 | 300 | 34 | −25 | 68 |
| K[a] | soft/sticky | soft/sticky | soft/sticky | Soft/sticky | −43 | n.p. |
| $K(H^+)$[a] | soft/sticky | soft/sticky | soft/sticky | Soft/sticky | −42 | n.p. |

[a]Comparative polymer, mechanical properties too poor to be determined
(n.d. = not determined; n.p. = not present).

Per polymer material, 3 to 5 dog bones have been prepared and average measured values are given in Table II. The tensile set (TS) is determined after break of the dog bones, and is thus defined here as $(L_{afterbreak}-L_0)/L_0*100\%$, with $L_0$ defined as before and $L_{afterbreak}$ being the length of the narrow middle part of the broken dog bone after the test and after piecing the testing bar together.

Table II shows that the prepared polymers (e), i.e. A, B, D, F, G and their protonated equivalents, are quite elastic, especially given their relatively low molecular weights (given in Table I). The tensile set is measured after break (>300% elongation), so the TS-values will be significant lower when determined after lower elongations of for example 50% or 100%. The Young's moduli show that the polymers (e) are real materials that are not sticky ($E_{mod}$>1 MPa). Moreover, the Young's modulus can be tailored by changing the (ratio between) the components (a), (b), (c) and (d). All polymers (e) give transparent films that are not or hardly hygroscopic.

Comparative Example 4

Polymer J

Applying the same procedure as mentioned in example 2 to material J, resulted in the formation of a precipitate. Hence, material J, lacking ionogenic or ionic groups, can not be dispersed or solubilized in water, as opposed to the polymers A(H$^+$)—H(H$^+$) given in Example 2.

Comparative Example 5

Polymers K and K(H$^+$) Versus Polymers D and D(H$^+$)

Applying the procedure as mentioned in example 2 to material K, resulted in the formation of a clear low viscous solution of polymer K(H$^+$). However, the material properties of materials K and K(H$^+$), respectively, are much poorer as those of, for example, materials D and D(H$^+$), respectively, that have incorporated 4H-units. Polymers K and K(H$^+$) are so soft and sticky that they do not allow the formation of a testing bar for mechanical testing; in contrast, polymers D and D(H$^+$) are non-sticky materials with very elastic properties.

Comparative Example 6

Generally, polymers (e)—for example those given in Tables I and II—adhere much better to various surfaces than comparable polymers without ionic or ionogenic groups such as polymer J. This latter polymer J can be peeled off surfaces easily or more easily than the polymers (e) of this invention.

The invention claimed is:

1. A supramolecular ionomer comprising a quadruple hydrogen bonding unit (4H-unit) and an ionic group within the polymer structure, wherein the supramolecular ionomer has the formula:

-[(a)$_p$-(b)$_q$-(c)$_r$-(d)$_s$]- wherein:
(a) is a monomeric unit represented by: (4H)$_k$—(F$_i$)$_l$, wherein F$_i$ comprises a reactive group linked to a 4H-unit, and k is at least 1 and l is at least 2, the 4H-unit being selected from the group consisting of:

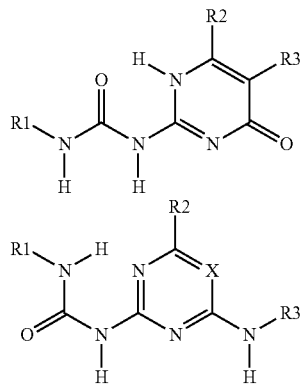

and wherein X is a nitrogen atom, or a carbon atom with an attached R4 group, wherein R4 is a hydrogen, a saturated or unsaturated, branched, cyclic or linear alkyl chains, aryl chains, alkaryl chains, alkylaryl chains, ester chains, or ether chains, optionally substituted with one or more functionalities, wherein R1, R2, and R3 is independently a hydrogen, a saturated or unsaturated, branched, cyclic or linear alkyl chains, aryl chains, alkaryl chains, alkylaryl chains, ester chains, or ether chains, optionally substituted with one or more functionalities, and wherein at least two of R1, R2, R3, and R4 connects, directly or indirectly, to F$_i$, and each F$_i$ is coupled to another monomeric unit, (b) is a macromonomeric unit,
(c) is a monomeric unit comprising an ionic group,
(d) is a reactive monomeric unit,
p=2-200, q=2-50, r=1-200 and s is 0-200.

2. The supramolecular ionomer according to claim 1, wherein the supramolecular ionomer has a number average molecular weight of about 2000 to about 200000.

3. The supramolecular ionomer according to claim 1, wherein the amount of quadruple hydrogen bonding units (4H-units) incorporated in the polymer structure is about 5 to about 50 mol %, based on the total amount of moles of (a), (b), (c) and (d).

4. The Supramolecular ionomer according to claim 1, wherein the monomeric unit (a) is represented by formula (III):

$$F_1\text{-4H}—F_1 \text{ or } F_1\text{-4H}—F_2 \quad \text{(III)}$$

wherein F$_1$ and F$_2$ comprise a reactive group linked to the 4H-unit.

5. A process for the preparation of a supramolecular ionomer, comprising chain extending a monomeric unit (a) comprising at least one quadruple hydrogen bonding unit (4H-unit) or at least one precursor of a quadruple hydrogen bonding unit (4H*-unit) with a monomeric unit (c) comprising an ionic and/or an ionogenic group, wherein monomeric unit (a) is represented by formula (I) or (II):

$$(4H)_k—(F_i)_l, \text{ tm (I)}$$

$$(4H^*)_k—(F_i)_l \quad \text{(II)}$$

wherein F$_i$ comprises a reactive group linked to the 4H-unit or linked to or part of the 4H*-unit, and k is at least 1 and l is at least 2, the 4H-unit being selected from the group consisting of:

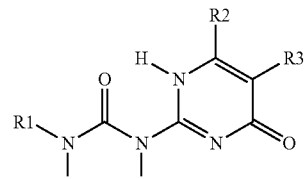

and

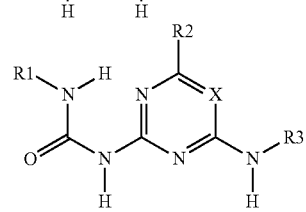

and the 4H*-unit being selected from the group consisting of

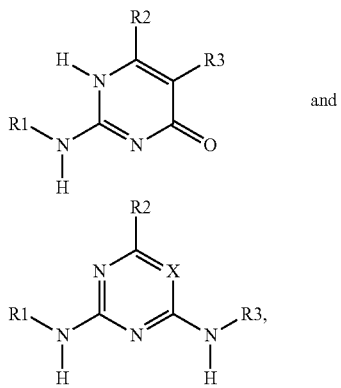

and wherein X is a nitrogen atom, or a carbon atom with an attached R4 group, wherein R4 is a hydrogen, a saturated or unsaturated, branched, cyclic or linear alkyl chains, aryl chains, alkaryl chains, alkylaryl chains, ester chains, or ether chains, optionally substituted with one or more functionalities, wherein R1, R2, and R3 is independently a hydrogen, a saturated or unsaturated, branched, cyclic or linear alkyl chains, aryl chains, alkaryl chains, alkylaryl chains, ester chains, or ether chains, optionally substituted with one or more functionalities, and wherein at least two of R1, R2, R3, and R4 connects, directly or indirectly, to $F_i$, and each $F_i$ is coupled to another monomeric unit, wherein the monomeric unit (a) is further chain extended with a macromonomeric unit (b).

6. The process according to claim 5, wherein the monomer unit (a) is further chain extended with a reactive monomeric unit (d).

7. The process according to claim 6, wherein the reactive monomeric unit (d) is represented by the general formula (IX):

$$J\text{-}(F_i)_l \qquad (IX)$$

wherein J is an organic moiety, $F_i$ is a reactive group, and l is 1 to 5.

8. The process according to claim 7, wherein the reactive monomeric unit (d) is represented by the general formula (X):

$$F_7\text{-}J\text{-}F_7 \text{ or } F_7\text{-}J\text{-}F_8 \qquad (X)$$

wherein J is an organic moiety and $F_7$ and $F_8$ are reactive groups.

9. The process according to claim 8, wherein the reactive monomeric unit (d) is a diisocyanate.

10. The process according to claim 7, wherein the reactive monomeric unit (d) is a diisocyanate.

11. The process according to claim 5, wherein the monomeric unit (a) is represented by formula (III) or (IV):

$$F_1\text{-}4H\text{—}F_1 \text{ or } F_1\text{-}4H\text{—}F_2 \qquad (III)$$

$$F_1\text{-}4H^*\text{—}F_1 \text{ or } F_1\text{-}4H^*\text{—}F_2 \qquad (IV)$$

wherein $F_1$ and $F_2$ comprise a reactive group linked to the 4H-unit or linked to or part of the 4H*-unit.

12. The process according to claim 11, wherein the reactive groups of monomeric unit (a) and monomeric unit (b) are selected from the group consisting of hydroxyl, primary amino and isocyanate groups and combinations thereof.

13. The process according to claim 5, wherein the reactive groups of monomeric unit (a) and monomeric unit (b) are selected from the group consisting of hydroxyl, primary amino and isocyanate groups and combinations thereof.

14. The process according to claim 5, wherein the monomeric unit (c) comprising an ionic and/or an ionogenic group is represented by the general formula (VII):

$$(I)_k\text{—}(F_i)_l \qquad (VII)$$

wherein I is an ionic or an ionogenic group, $F_i$ is a reactive group, k is 1-3, and l is 1-5.

15. The process according to claim 14, wherein monomeric unit (c) is represented by the general formula (VIII):

$$F_5\text{—}I\text{—}F_5 \text{ or } F_5\text{—}I\text{—}F_6 \qquad (VIII)$$

wherein $F_5$ and $F_6$ are reactive groups and I is an ionic and/or an ionogenic group.

16. The process according to claim 15, wherein the reactive groups of monomeric unit (c) are selected from the group consisting of hydroxyl and primary amino and combinations thereof.

17. The process according to claim 14, wherein the reactive groups of monomeric unit (c) are selected from the group consisting of hydroxyl and primary amino and combinations thereof.

18. A supramolecular ionomer obtainable by the process according to claim 5.

19. A composition comprising a supramolecular ionomer accordine to claim 10.

20. The composition according to claim 19, wherein the composition is aqueous.

21. The process according to claim 5, wherein the macromonomeric unit (b) is represented by formula (V):

$$P\text{—}(F_i)_l \qquad (V)$$

wherein P represents a polymer chain having a number average molecular weight of 100 to 100000, $F_i$ comprises a reactive group, and l is 1 to 6.

22. The process according to claim 21 wherein P is selected from the group consisting of polyethers, polyesters, polycarbonates, polysiloxanes and hydrogenated polyolefins.

23. The process according to claim 21, wherein the macromonomeric unit (b) is represented by formula (VI):

$$F_3\text{—}P\text{—}F_3 \text{ or } F_3\text{—}P\text{—}F_4 \qquad (VI)$$

wherein $F_3$ and $F_4$ comprise a reactive group.

24. The process according to claim 23, wherein P is selected from the group consisting of polyethers, polyesters, polycarbonates, polysiloxanes and hydrogenated polyolefins.

25. The process according to claim 23, wherein the reactive groups of monomeric unit (a) and monomeric unit (b) are selected from the group consisting of hydroxyl, primary amino and isocyanate groups and combinations thereof.

26. A composition comprising a supramolecular ionomer, said supramolecular ionomer having the formula:

$$\text{-}[(a)_p\text{-}(b)_q\text{-}(c)_r\text{-}(d)_s]\text{-}$$

wherein:

(a) is a monomeric unit represented by: $(4H)_k\text{—}(F_i)_l$, wherein $F_i$ comprises a reactive group linked to a 4H-unit, and k is at least 1 and l is at least 2, the 4H-unit being selected from the group consisting of:

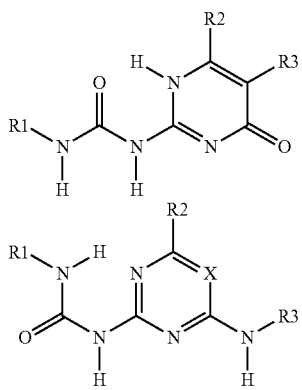
and
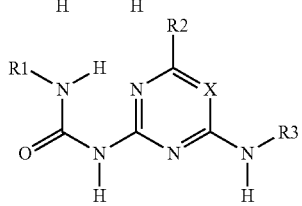

wherein X is a nitrogen atom, or a carbon atom with an attached R4 group, wherein R4 is a hydrogen, a saturated or unsaturated, branched, cyclic or linear alkyl chains, aryl chains, alkaryl chains, alkylaryl chains, ester chains, or ether chains, optionally substituted with one or more functionalities, wherein R1, R2, and R3 is independently a hydrogen, a saturated or unsaturated, branched, cyclic or linear alkyl chains, aryl chains, alkaryl chains, alkylaryl chains, ester chains, or ether chains, optionally substituted with one or more functionalities, and wherein at least two of R1, R2, R3, and R4 connects, directly or indirectly, to $F_i$, and each $F_i$ is coupled to another monomeric unit, (b) is a macromonomeric unit,
(c) is a monomeric unit comprising an ionic group,
(d) is a reactive monomeric unit, p=2-200, q=2-50, r=1-200 and s is 0-200.

27. The composition according to claim 26, wherein the composition is aqueous.

* * * * *